(12) United States Patent
Sauve

(10) Patent No.: US 6,227,324 B1
(45) Date of Patent: May 8, 2001

(54) ELECTRICALLY POWERED SCOOTER

(76) Inventor: Dennis N. Sauve, 1060 Commerce Blvd. North, Sarasota, FL (US) 34243

(*) Notice: Subject to any disclaimer, the term of this patent is extended or adjusted under 35 U.S.C. 154(b) by 0 days.

(21) Appl. No.: 09/559,607

(22) Filed: Apr. 27, 2000

(51) Int. Cl.[7] .................. B62K 11/10; B62D 61/02
(52) U.S. Cl. .................. 180/228; 180/220; 180/221; 180/181; 180/342; 180/65.1; 280/87.041
(58) Field of Search ........................ 180/219, 220, 180/221, 228, 180, 181, 342, 343, 65.1, 213, 214; 280/87.041, 87.042

(56) References Cited

U.S. PATENT DOCUMENTS

| | | | | |
|---|---|---|---|---|
| 4,418,784 | * | 12/1983 | Fox | 180/221 |
| 4,821,832 | * | 4/1989 | Patmont | 180/219 |
| 5,183,129 | * | 2/1993 | Powell | 180/219 |
| 5,388,659 | * | 2/1995 | Pepe | 180/219 |
| 5,775,452 | * | 7/1998 | Patmont | 180/181 |
| 5,927,420 | * | 7/1999 | Karrington | 180/181 |
| 6,012,539 | * | 1/2000 | Patmont | 280/87.041 |
| 6,095,274 | * | 8/2000 | Patmont | 180/181 |

FOREIGN PATENT DOCUMENTS 35 37 522 A1 * 4/1987 (DE).
42 40 439 A1 * 6/1994 (DE).

* cited by examiner

Primary Examiner—Lanna Mai
Assistant Examiner—Ruth Ilan
(74) Attorney, Agent, or Firm—William Nitkin

(57) ABSTRACT

An electrically powered scooter is disclosed having a chassis with a platform upon which the rider stands, a front wheel mounted to provide steering control and a rear wheel rotatably mounted at the rear section of the chassis. A pedal is pivotably mounted at the rear section of the chassis and is attached to the motor and drive wheel. The pedal, in an inactive position holds such drive wheel in a position where it does not contact the rear wheel. When the pedal is depressed by the foot of the rider, the motor is turned on and the drive wheel contacts the rear wheel, propelling the scooter forward. When released, the pedal returns automatically by spring means to its inactive position, breaking the contact of the rear wheel with the drive wheel, and automatically turning the motor off.

3 Claims, 2 Drawing Sheets

FIG. I

ELECTRICALLY POWERED SCOOTER

BACKGROUND OF THE INVENTION

1. Field of the Invention

The invention herein resides in the field of electrically powered scooters and more particularly relates to a scooter having a mounted motor and drive wheel, the interconnection of which to the rear wheel is foot-activated when desired.

2. History of the Prior Art

Scooters are normally built with a steerable front wheel and a fixed back wheel rotatably mounted on a chassis having a central platform. For gain momentum, the rider stands with one foot on the platform of the scooter and pushes off on the ground with the other foot to propel the scooter forward. For additional momentum, driving means of different mechanical types have been provided for transmitting force from the rider to the front or rear wheel, such as disclosed in U.S. Pat. Nos. 4,960,286 and 4,911,457. Also disclosed in U.S. Pat. No. 4,915,403 is a foot pedal mechanically geared to the rear wheel of the scooter for providing additional momentum by the rider's depression of the foot pedal to propel the scooter forward. Skateboards with battery-powered electric motors are also known. In one such embodiment, an electric motor is connected to one of the wheel's axles to rotate it by means of a belt attached to the electric motor, such as disclosed in U.S. Pat. No. 5,020,621. Although most motorized scooters employ a clutch to provide some free wheeling when the motor is turned off, there is still considerable friction and drag caused by such clutches. Because of this drag, the rider has to continuously apply power to maintain speed, thereby discharging the battery quickly.

SUMMARY OF THE INVENTION

It is an object of the present invention to provide an electric battery-powered scooter that has an easy-to-use and highly efficient mode of operation.

It is a further object of the invention to provide an electric scooter with drag-free coasting, thereby increasing travel distance between battery charging.

The electrically powered scooter of this invention includes a chassis having a front section, a central section and a rear section. In the central section of the chassis is mounted a platform upon which the rider can stand and under which platform is disposed a battery. The scooter has a front wheel mounted to provide steering control at the front section of the chassis and a least one back wheel rotatably mounted at the rear section of the chassis. The scooter is equipped with a foot-operated drive means incorporating a motor mounted on a pedal that can be shifted from an inactive position to an activated position, at the same time activating the motor which, via force transmission means, causes the back wheel to rotate. The electric motor can be placed on a side of the rider's foot-operated pedal. The pedal can have one end pivotably attached at the rear section of the chassis and in the inactivated position the force transmission means for transmitting force from the motor to the rear wheel of the scooter is mounted on the shaft of the motor where it does not contact the rear wheel. When the rider depresses the pedal, the force transmission means, being a drive wheel, contacts and drives the rear wheel. The scooter is equipped with a resilient return member adapted to urge the pedal from its depressed, activated position to an inactivated position after the rider has released foot pressure so that the drive wheel no longer contacts the rear wheel. The resilient return member can be a spring or other equivalent structure.

As the rider depresses the pedal and then removes his foot from the pedal, the electric motor drive is, respectively, turned on and off via control means which can be a switch interconnected between the motor and the battery. The switch turns on the motor and by the same depressing of the pedal, the drive wheel on the shaft of the motor engages the rear wheel, propelling the scooter forward. When the pedal is released, the action of the resilient return member causes the pedal to return to its inactive position and stop contact of the drive wheel with the rear wheel; and at the same time the switch automatically turns off the motor.

The force transmission means to transmit force from the motor to the rear wheel of the scooter can be a friction-type drive wheel disposed on the shaft of the motor. The drive wheel of the force transmission can be made of rubber, neoprene, metal or other equivalent suitable material. The control means is in the form of a switch interconnecting the motor with the battery for turning the motor on and off, and such switch can be a leaf switch, pressure switch, touch switch or other equivalent type of switch. The scooter steering mechanism can include a steering handle, a post ending in a yoke with the front wheel rotatably fixed therein. The scooter can also include means for adjusting the height of the post and means for folding the scooter for storage.

DESCRIPTION OF THE PREFERRED EMBODIMENT(S)

Figure 1:
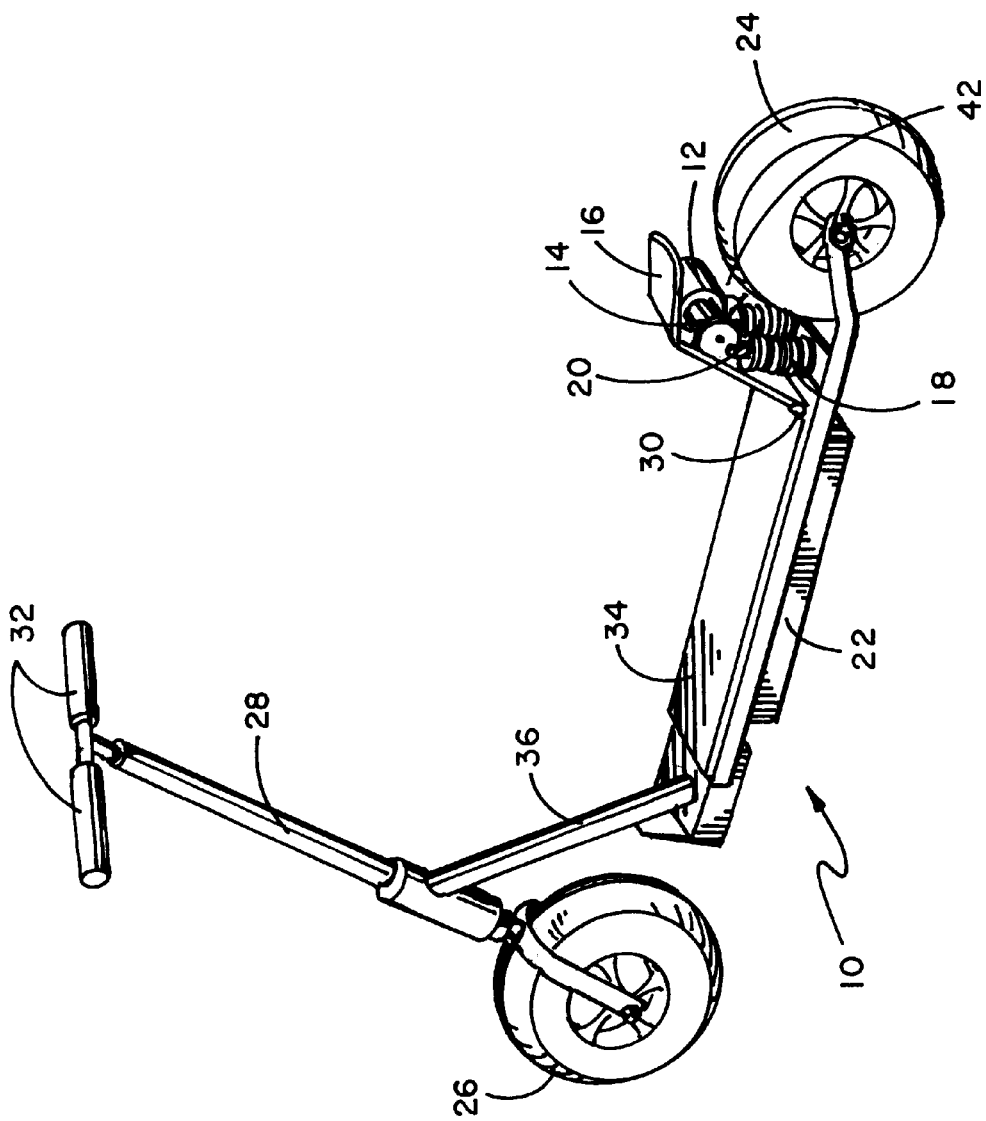
FIG. 1 illustrates a perspective view of the electrically powered scooter of this invention.
Figure 2:
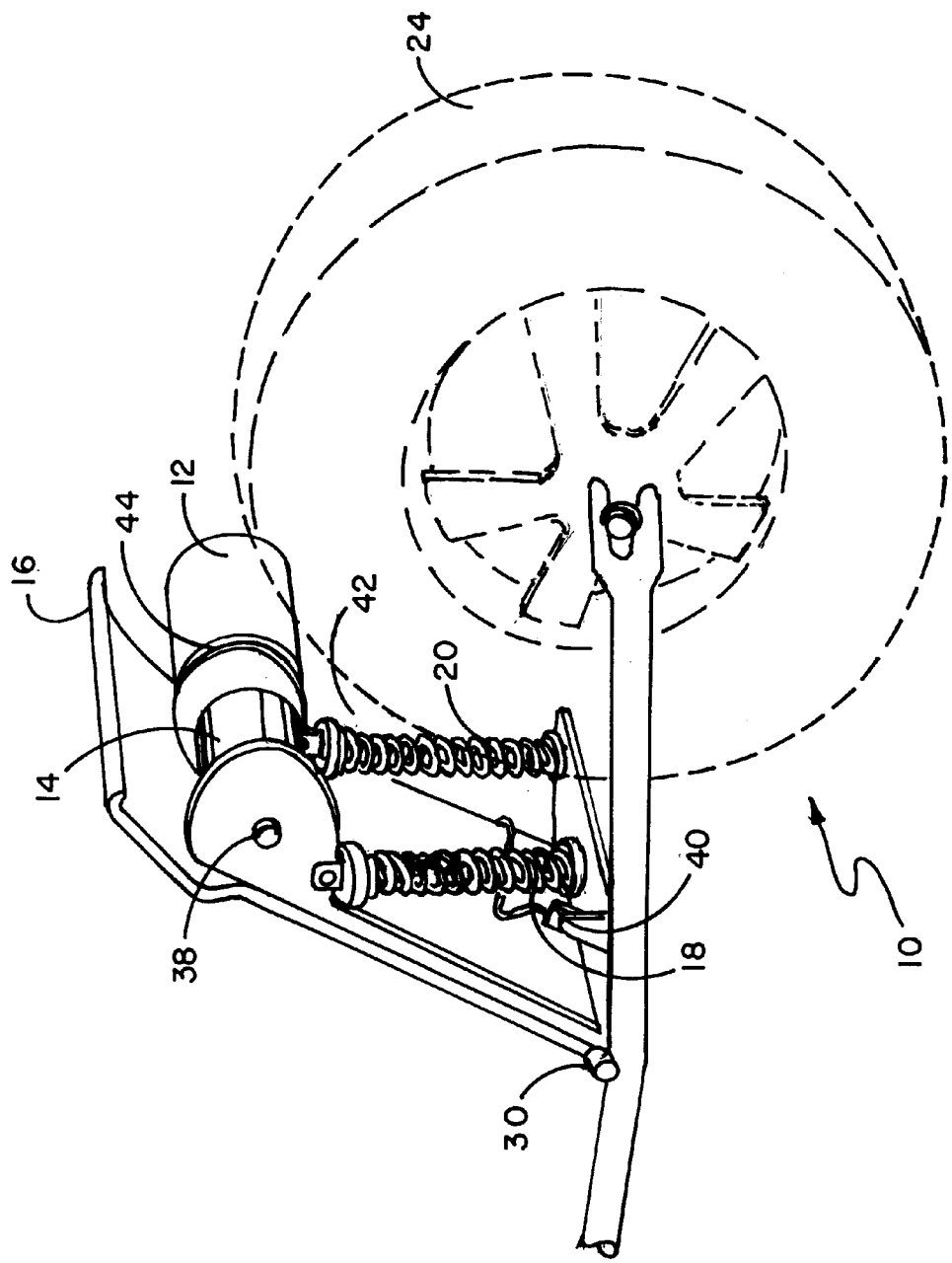
FIG. 2 illustrates a perspective view of the rear wheel and drive mechanism of the electrically powered scooter of this invention.

FIG. 1 illustrates a perspective view of scooter 10 of this invention having front wheel 26 mounted in a yoke on post 28 surmounted by a typical steering handle 32, all of which are attached to chassis 36 which extends back and is attached to rear wheel 24. Some scooters incorporating the present invention can be of the collapsible type with folding front posts. On top of the central section of chassis 36 is platform 34 on which the rider stands. Beneath platform 34 is battery 22. Disposed at the rear end of platform 34 is pedal 16 which is pivotably attached at its base by pivot member 30 to platform 34 such that the rider of the scooter, when desired, can apply foot pressure against pedal 16 and depress the pedal downward, as described below. Pedal 16 is held in an inactive position, as seen in FIG. 1, by the stiffness of a resilient return member, which in a preferred embodiment can be first and second springs 18 and 20, which hold the pedal upright in place away from any contact with rear wheel 24 with which it is aligned. In some embodiments a single spring can be utilized. When pedal 16 is depressed rearward by the pressure of the rider's foot thereagainst, it pivots on pivot member 30, causing first and second springs 18 and 20 to bend rearward until drive wheel 14 comes in contact with rear wheel 24 with which it is aligned. At this point switch 40, as seen in FIG. 2, is turned on by the movement of pedal 16, directing power from battery 22 to motor 12 which action rotates drive wheel 14 as drive wheel 14 is positioned on shaft 38 of motor 12 which shaft is parallel to the axis of rear wheel 24. Motor 12 is held on by bracket 44 attached to the rear of pedal 16. In some embodiments the motor could be displaced from being perpendicular to the shaft by gears. When the rotating drive wheel 14 comes in contact with rear wheel 24, it propels the scooter forward. When foot pressure is released from pedal 16, first and second springs 18 and 20, being resilient in nature, return to their first inactive position, pushing pedal 16 and its attached drive wheel 14 away from contact with rear wheel 24 so that rear wheel 24 is no longer driven by motor 12. At the same time switch 40 is turned off by such pedal movement, cutting power to motor 12 so that it ceases operation; and drive wheel 14 no longer rotates. This cutting off of power preserves the life of battery 22.

The present invention represents a significant advance over prior art scooters. Simple and easy control is achieved by mounting the motor and drive wheel on a spring-loaded pedal pivotably attached to the rear section of the chassis, and the forward movement of the scooter is easily controlled by depressing the pedal with one foot. By depressing the pedal with his foot, the rider turns on the motor and brings the drive wheel of the motor into contact with the rear wheel. Removing the foot from the pedal disengages the drive wheel of the motor from the rear wheel, and the switch turns off the motor. The electrically powered scooter of this invention allows for free wheeling without motor drag since, when the motor is turned off, the drive wheel is separated from the rear wheel by clearance space 42 and is not in contact with the rear wheel. Power to the rear wheel can be turned on and regulated as necessary by the rider to optimize coasting. Coasting is desirable as it drag-free, allowing the scooter to cover an optimum distance between applications of motor power so as to extend the distance traveled between battery rechargings.

Although the present invention has been described with reference to particular embodiments, it will be apparent to those skilled in the art that variations and modifications can be substituted therefor without departing from the principles and spirit of the invention.

I claim:

1. A scooter having a chassis having a front section, a central section and a rear section for support of a rider thereon; a front wheel disposed at said front section of said chassis, said front wheel attached to a steering mechanism; a rear wheel having a rotational axis disposed at said rear section of said chassis; a platform having a rear, a top and a bottom, said platform disposed on said central portion of said chassis; a battery disposed under said platform wherein the improvement comprises;

a pedal hingeably attached to said rear of said platform;

a resilient return member attached from a rear section of said chassis to said pedal for holding said pedal in a first inactive position;

a motor attached to said pedal, said motor powered by said battery;

a drive wheel attached to said motor, said drive wheel being aligned with said rear wheel of said scooter when said pedal is in an inactive position;

said pedal being maneuverable by pressure from said rider's foot to a second active position, causing a bending of said resilient return member and contact of said drive wheel with said rear wheel, said resilient return member, when foot pressure is removed from said pedal, returning said pedal to its first inactive position, thereby displacing said drive wheel away from contact with said rear wheel; and switch means interposed between said motor and said battery, said pedal turning said switch means off when said pedal is in its first inactive position, cutting power from said battery to said motor and said pedal turning said switch means on when said pedal is in its second active position being depressed, to direct power from said battery to said motor for rotatating said drive wheel.

2. The scooter of claim 1 wherein said resilient return member comprises at least one spring member.

3. The scooter of claim 2 further including a shaft disposed parallel to said rotational axis of said rear wheel, with said motor driving said shaft and said drive wheel positioned on said shaft.

* * * * *